E. J. HOWLETT.

Tools for the Manufacture of Paper Bags.

No. 6,050. Reissued Sept. 15, 1874.

Witnesses.

J. Bonsall Taylor.

William Parent

Inventor.

Edwin J. Howlett, by his Atty,

Horace Binney, 3d.

UNITED STATES PATENT OFFICE.

EDWIN J. HOWLETT, OF PHILADELPHIA, PENNSYLVANIA, ASSIGNEE OF HIMSELF AND SUSAN M. KIRK.

IMPROVEMENT IN TOOLS FOR THE MANUFACTURE OF PAPER BAGS.

Specification forming part of Letters Patent No. 63,342, dated February 26, 1867; reissue No. 3,718, dated November 9, 1869; reissue No. 4,029, dated June 14, 1870; reissue No. 6,050, dated September 15, 1874; application filed August 7, 1874.

*To all whom it may concern:*

Be it known that EDWIN J. HOWLETT, of the city and county of Philadelphia, in the State of Pennsylvania, and SUSAN M. KIRK, of the city and county of Camden, in the State of New Jersey, did invent a Tool for Manufacturing Paper Bags; and I, the said EDWIN J. HOWLETT, do hereby declare the following to be a full, clear, and exact description of the same, reference being had to the accompanying drawing and to the letters of reference marked thereon.

This invention consists of an instrument, hereinafter fully described, whereby the closing of the ends of paper tubes and the conversion of said tubes into paper bags are facilitated.

In order that others may be enabled to make and use the aforesaid invention, I proceed to describe its construction and operation.

The invention is illustrated in the accompanying drawing, which forms a part of this specification, and in which—

Figure 1:
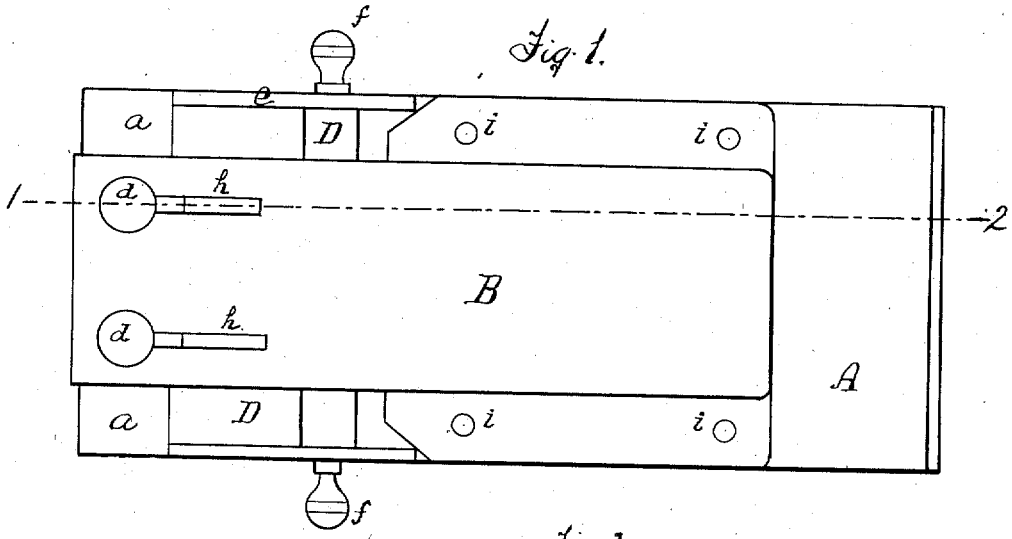
Figure 2:
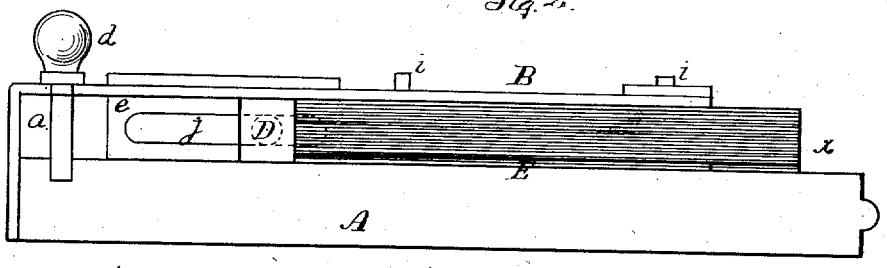
Figure 3:
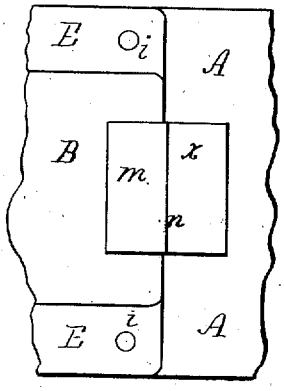
Figure 4:
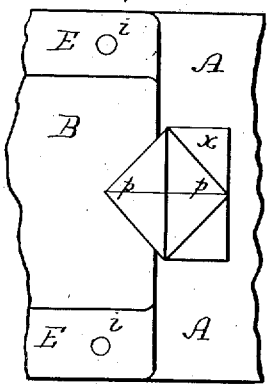

Figure 1 is a plan or top view of the instrument for facilitating the manufacture of paper bags. Fig. 2 is a section on the line 1 2, Fig. 1; and Figs. 3, 4, and 5, diagrams illustrating the manner of using the instrument.

Similar letters refer to similar parts throughout the several views.

A represents a plain flat board, to the upper surface of which, near one end, is secured a transverse strip, *a*, and to the top of the latter is secured a blade, B, by set-screws *d*, the stems of the latter passing through elongated openings in the blade, which is made of thin elastic metal or other suitable material, its outer end tending to bear on the board A. On each edge of this board, and near the strip *a*, is a vertical plate, *e*, each plate having an elongated opening, *j*, through which passes a set-screw, *f*, into the end of the strip D, so that, after loosening these screws, the said strip can be adjusted on the board A, to or from the strip *a*, at pleasure, and secured after adjustment.

A plate, E, is illustrated in the drawing as occupying a position beneath the blade B; but this plate is not necessary, excepting in the absence of the blade, and when used in the manner and under the circumstances described hereafter.

Figure 5:
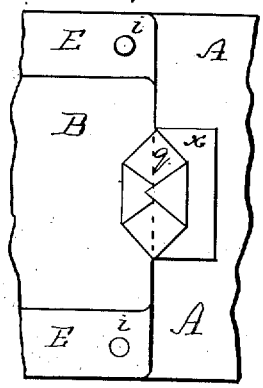

The instrument is employed in the following manner for aiding the operator in closing the bottom of paper bags:

Several tubes of paper, open at both ends and flattened into a compact layer, are placed evenly, one above another, as shown at *x*, Fig. 2, on the board A, beneath the blade B, the layer at one end bearing against the strip D, which has been so adjusted that the opposite end of the layer shall project a given distance beyond the outer end of the blade. The operator now takes the projecting end of the uppermost of the tubes of paper and turns it over, and presses it against the upper surface of the plate, as seen at *m*, Fig. 3, the fold having an edge, *n*, determined by the end of the plate. The folded portion is now elevated, the tube of paper stretched laterally and pressed down, so as to assume the form represented in Fig. 4. The corners *p p* are now folded, as seen in Fig. 5, and the folds pasted, thus completing the bottom of the bag, which is again folded on the dotted line *q*, after which the entire bag is withdrawn from beneath the blade B and placed upon a layer of previously-completed bags, and submitted to a moderate pressure.

Tube after tube of the layer beneath the blade is thus treated with that rapidity which could not be effected without the aid of the above-described instrument.

When larger or shorter bags are required the strip D is so adjusted that no more of each tube shall project beyond the end of the blade than is absolutely necessary for making the folds described.

If the openings in the blade B, for the admission of the screw *d*, are made of sufficient length to allow the blade to be adjusted longitudinally, the strip D may be dispensed with, the front of the stationary strip *a* in this case serving as a guide against which to adjust the tubes of paper, and the adjustable blade serving to determine the extent of the projection of the tubes beyond the outer end of the said blade.

A simple plate, E, may be used in the place of the blade, the plate being maintained in one position, laterally and longitudinally, by guiding-pins *i*, which permit it to be elevated, so that a layer of flattened paper tubes may be placed beneath it, the tubes in this case being folded over the front edge of the plate. The plate or blade B may be fixed, if desired, instead of adjustable.

What I claim as the invention of myself and the said SUSAN M. KIRK, and desire to secure by Letters Patent of the United States, is—

1. The combination of the board A, blade B, and adjustable strip D, the whole being arranged substantially in the manner described.

2. The combination of the board A, strip *a*, and blade B.

3. The combination of a board, A, with a blade, B, secured substantially as described.

4. The combination of the board A, the guide-plate E, and adjustable strip D.

5. The combination of the board A with the plate E, secured thereto substantially as described.

EDWIN J. HOWLETT.

Witnesses:

JNO. P. ONDERDONK,

GEORGE V. ONDERDONK.